T. F. HUDSON.
DOUBLE DRAG.
APPLICATION FILED APR. 17, 1919.

1,318,561.

Patented Oct. 14, 1919.

T. F. Hudson, Inventor

Witness

By C. A. Snow & Co.
Attorneys

UNITED STATES PATENT OFFICE.

THOMAS F. HUDSON, OF NORTH ENGLISH, IOWA.

DOUBLE DRAG.

1,318,561. Specification of Letters Patent. Patented Oct. 14, 1919.

Application filed April 17, 1919. Serial No. 290,742.

*To all whom it may concern:*

Be it known that I, THOMAS F. HUDSON, a citizen of the United States, residing at North English, in the county of Iowa and State of Iowa, have invented a new and useful Double Drag, of which the following is a specification.

The device forming the subject matter of this application is a drag, adapted to be used on the highway and elsewhere, and one object of the invention is to provide novel means whereby a pair of frames may be held at adjusted angles with respect to each other, and with respect to the draft line.

Another object of the invention is to provide novel means whereby the frames of the drag may be separated at any desired distance. A further object of the invention is to provide novel means whereby the frames may be connected with a separate draft mechanism, the construction being such that the frames are strengthened and reinforced.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention can be shown without departing from the spirit of the invention.

Figure 1:
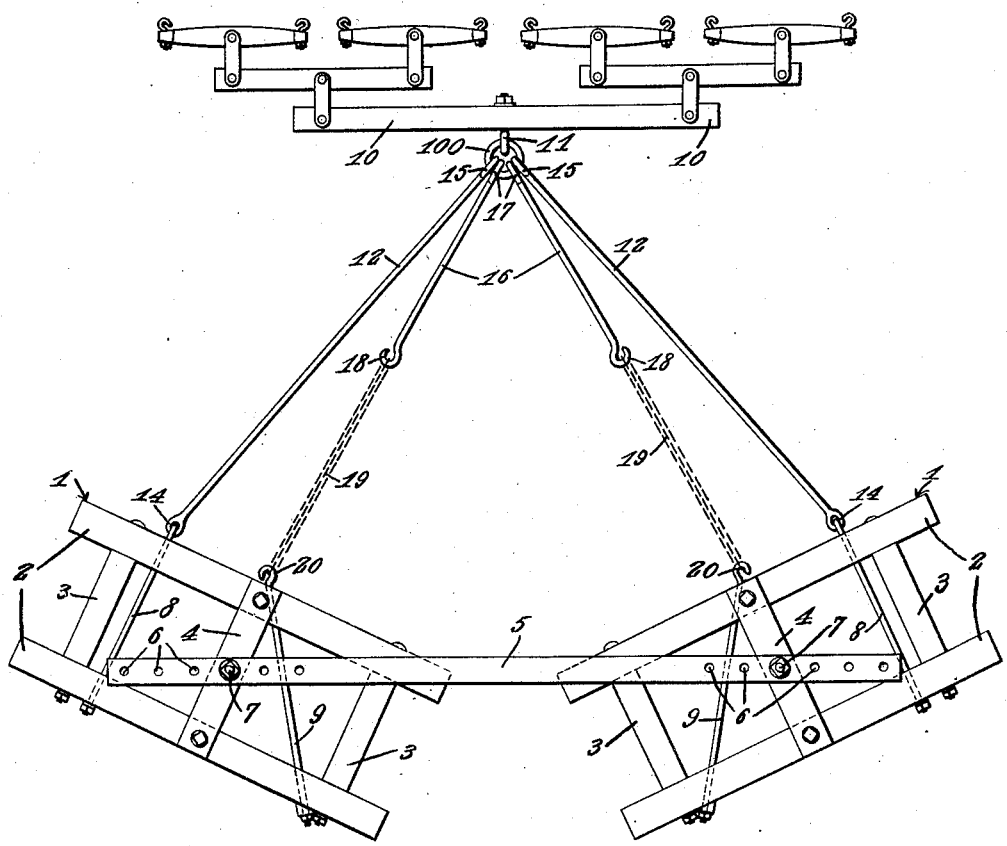
Figure 2:
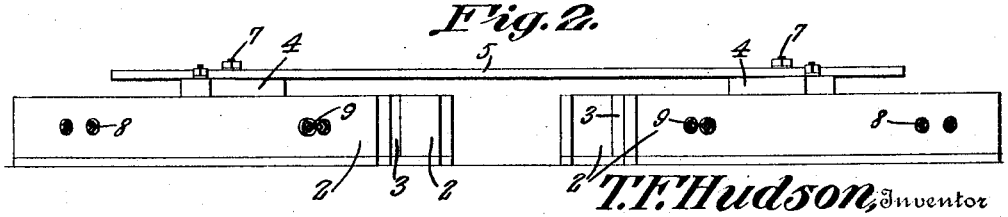

In the accompanying drawings:

Figure 1 shows in top plan, a drag constructed in accordance with the invention and Fig. 2 is a rear elevation of the drag.

The drag forming the subject matter of this application includes a pair of frames denoted generally by the numeral 1. Each frame 1 includes a pair of longitudinal bars 2 connected adjacent their ends by braces 3. The bars 2 of the frame 1 are united, intermediate their ends, and upon their upper edges, by a transverse brace 4. The numeral 5 denotes a beam provided adjacent its ends with openings 6. In any of the openings 6, a pivot element 7 may be mounted, the pivot element 7 being secured to the braces 4 of the frames 1. Owing to this construction, the frames 1 may be separated by adjusted distances, determined by the length of the beam 5. A first rod 8 extends through the bars 2 near to the outer ends thereof. The rod 8 is disposed at right angles to the bars 2. A second rod 9 extends through the bars 2, inwardly of the first rod 8, and is disposed at an acute angle to the bars 2. The numeral 10 marks a draft tree provided intermediate its ends with an eye bolt 11 or the like. A link 12 is pivoted at its rear end, as shown at 14, to the forward end of the rod 8 and is pivoted at its forward end as shown at 15 to a ring 100 carried by the eye bolt 11. The numeral 16 marks a link, pivoted at its forward end, as shown at 17 to the ring 100, and provided at its rear end with a hook 18 adapted to receive one of the links at the forward end of a chain 19, of any desired length. The rear end of the chain is mounted on the hook 20, fashioned at the forward end of the rod 9.

Obviously, the frames 1 may be separated at any desired distance by mounting the pivot elements 7 in the openings 6. The effective length of the chains 19 may be shortened or increased, by connecting the links of the chains with the hooks 18 or with the hooks 20. In this way, the frames 1 may be held at adjusted angles with respect to the draft line.

The material loosened when the frames 1 are drawn over the surface of the highway, will be carried inwardly, toward the longitudinal center of the highway, and will form a crown for the highway.

The device forming the subject matter of this application is simple in construction and comprises few parts, but it will be found thoroughly efficient for the ends in view.

Owing to the fact that the rods 8 and 9 extend through the constituent bars 2 of the frames 1 at the angles specified, with respect to the bars, a strong construction is afforded and the frames 1 are reinforced and sustained.

Having thus described the invention, what is claimed is:—

A drag comprising two frames each including front and rear parallel longitudinal bars, inner and outer braces uniting the bars adjacent to their ends, an intermediate brace uniting the bars midway between their ends, a first rod connecting the bars adjacent to the outer brace and disposed parallel thereto, a second diagonal rod connected at its rear end to the rear bar and adjacent to the inner brace and having its forward end mounted in the forward bar in alinement with the intermediate brace; a beam pivoted to the intermediate braces; inextensible connections pivoted at their rear ends to the forward ends of the first rods; longitudinally adjustable connections having their rear ends assembled with the forward ends of the second rods; a draft mechanism; and means for attaching the forward ends of all of the connections with the draft mechanism at a common point.

In testimony that I claim the foregoing as my own, I have hereto affixed my signature in the presence of two witnesses.

THOMAS F. HUDSON.

Witnesses:
C L. MONTROSE,
HARRISON DIXOM.

Copies of this patent may be obtained for five cents each, by addressing the "Commissioner of Patents, Washington, D. C."